United States Patent
Niwa

(10) Patent No.: US 11,975,639 B2
(45) Date of Patent: May 7, 2024

(54) SEAT BACK FRAME FOR IMPACT DEFORMATION

(71) Applicant: Lear Corporation, Southfield, MI (US)

(72) Inventor: Masayuki Niwa, Bangkok (TH)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/555,613

(22) Filed: Dec. 20, 2021

(65) Prior Publication Data

US 2023/0191964 A1 Jun. 22, 2023

(51) Int. Cl.
*B60N 2/427* (2006.01)
*B60N 2/68* (2006.01)

(52) U.S. Cl.
CPC .......... *B60N 2/42709* (2013.01); *B60N 2/68* (2013.01)

(58) Field of Classification Search
CPC ............ B60N 2/42709; B60N 2/42745; B60N 2/7058
See application file for complete search history.

(56) References Cited

U.S. PATENT DOCUMENTS

| | | | | |
|---|---|---|---|---|
| 3,501,200 A * | 3/1970 | Seizo | ........................ | B60N 2/68 296/68.1 |
| 3,544,164 A * | 12/1970 | Seizo | ................. | B60N 2/42709 297/452.2 |
| 3,802,737 A | 4/1974 | Mertens | | |
| 4,076,306 A * | 2/1978 | Satzinger | ............... | B60N 2/688 297/483 |
| 4,598,950 A * | 7/1986 | Fourrey | ............. | B60N 2/42709 297/452.2 |
| 5,050,932 A * | 9/1991 | Pipon | ..................... | B60N 2/682 297/354.12 |
| 5,362,132 A * | 11/1994 | Griswold | ............... | B60N 2/688 297/483 |
| 5,749,135 A * | 5/1998 | Crane | ................... | B21C 23/085 29/415 |
| 8,132,862 B2 * | 3/2012 | Yamada | ................. | B60N 2/682 297/216.13 |
| 8,845,019 B2 * | 9/2014 | Sawada | ................ | B60N 2/4214 297/216.1 |
| 9,522,617 B2 * | 12/2016 | Seki | .................... | B60N 2/42709 |
| 10,611,280 B2 * | 4/2020 | Hashimoto | ........... | B21D 47/04 |
| 10,967,774 B2 | 4/2021 | Mori | | |
| 11,279,488 B2 * | 3/2022 | D'Alessio | .......... | B60N 2/42709 |

(Continued)

FOREIGN PATENT DOCUMENTS

CN 102910099 A * 2/2013 ............ B60N 2/682
DE 102012213611 A1 2/2013

(Continued)

OTHER PUBLICATIONS

German Office Action with English translation for Application No. 10 2022 125 553.0, dated Jul. 7, 2023, 18 pages.

(Continued)

*Primary Examiner* — Timothy J Brindley
(74) *Attorney, Agent, or Firm* — Brooks Kushman P.C.

(57) ABSTRACT

A seat back frame is provided with a plurality of upright members, and at least one cross member interconnecting the plurality of upright members. At least one of the plurality of upright members has a weakened region to control deformation of the seat back frame in an impact condition.

24 Claims, 3 Drawing Sheets

(56) References Cited

U.S. PATENT DOCUMENTS

| | | | | |
|---|---|---|---|---|
| 11,524,609 | B2 * | 12/2022 | Ghalsasi | B60N 2/206 |
| 2005/0093352 | A1 * | 5/2005 | Yasuda | B60N 2/2222 |
| | | | | 297/284.1 |
| 2020/0023760 | A1 * | 1/2020 | Fujita | B60N 2/7094 |
| 2021/0188143 | A1 | 6/2021 | Pistilli et al. | |

FOREIGN PATENT DOCUMENTS

| | | | | |
|---|---|---|---|---|
| EP | 3517358 | A1 | 7/2019 | |
| JP | 2001341565 | A | 12/2001 | |
| JP | 201652820 | A | 4/2016 | |
| WO | WO-2006083024 | A1 * | 8/2006 | B60N 2/4214 |
| WO | WO-2014033963 | A1 * | 3/2014 | B60N 2/4228 |
| WO | 2020050818 | A1 | 3/2020 | |
| WO | WO-2020050818 | A1 * | 3/2020 | B60N 2/68 |
| WO | WO-2022039426 | A1 * | 2/2022 | |

OTHER PUBLICATIONS

Germany Office Action and English translation for Application No. 10 2022 125 553.0, dated Jan. 11, 2024, 11 pages.

* cited by examiner

SEAT BACK FRAME FOR IMPACT DEFORMATION

TECHNICAL FIELD

Various embodiments relate to a seat back frame designed to control deformation in an impact condition.

BACKGROUND

Pistilli et al. U.S. Patent Application Publication Number US 2021/0188143 A1, which published to Lear Corporation on Jun. 24, 2021 discloses a vehicle seat assembly with impact energy management.

SUMMARY

According to an embodiment, a seat back frame is provided with a plurality of upright members, and at least one cross member interconnecting the plurality of upright members. At least one of the plurality of upright members has a weakened region to control deformation of the seat back frame in an impact condition.

According to a further embodiment, the weakened region is formed midway along a length of the at least one of the plurality of upright members.

According to another further embodiment, the at least one of the plurality of upright members has a generally uniform cross section along a length thereof. A cross section of the weakened region is less than the generally uniform cross section.

According to another further embodiment, the at least one of the plurality of upright members has a tubular cross section. The weakened region is flattened.

According to an even further embodiment, the flattened weakened region faces a rear direction of the seat back frame.

According to another further embodiment, the at least one of the plurality of upright members is further provided with a structural wire. The weakened region is bent relative to a length of the structural wire.

According to another further embodiment, the plurality of upright members is further provided with an outboard upright member, and at least one inboard upright member laterally spaced apart from the outboard upright member. The weakened region is formed in the at least one inboard upright member.

According to an even further embodiment, the weakened region is not formed in the outboard upright member.

According to another further embodiment, the plurality of upright members is further provided with an outboard upright member, and a plurality of inboard upright members, each laterally spaced apart from the outboard upright member. The weakened region is formed in each of the plurality of inboard upright members.

According to another embodiment, a seat assembly is provided with a seat back frame with a plurality of upright members, and at least one cross member interconnecting the plurality of upright members. At least one of the plurality of upright members has a weakened region to control deformation of the seat back frame in an impact condition. The plurality of upright members is further provided with an outboard upright member, and at least one inboard upright member laterally spaced apart from the outboard upright member. The weakened region is formed in the at least one inboard upright member. A latch mechanism is attached to the seat back frame at the outboard upright member, or at the at least one cross member adjacent to the outboard upright member.

According to another embodiment, a seat assembly is provided with a seat back frame with a plurality of upright members, and at least one cross member interconnecting the plurality of upright members. At least one of the plurality of upright members has a weakened region to control deformation of the seat back frame in an impact condition. The plurality of upright members is further provided with an outboard upright member, and a plurality of inboard upright members, each laterally spaced apart from the outboard upright member. The weakened region is formed in each of the plurality of inboard upright members. A latch mechanism is attached to the seat back frame at the outboard upright member, or at the at least one cross member adjacent to the outboard upright member.

According to another embodiment, a seat assembly is provided with a seat back frame with a plurality of upright members, and at least one cross member interconnecting the plurality of upright members. At least one of the plurality of upright members has a weakened region to control deformation of the seat back frame in an impact condition. A latch mechanism is attached to the seat back frame at an outboard upright member of the plurality of upright members, or at the at least one cross member adjacent to the outboard upright member. The weakened region is formed in an inboard upright member spaced apart laterally from the outboard upright member.

According to another embodiment, a seat assembly is provided with a seat back frame with an outboard upright member. At least one inboard upright member is laterally spaced apart from the outboard upright member. At least one cross member interconnects the outboard upright member and the at least one inboard upright member. A latch mechanism is attached to the seat back frame at the outboard upright member, or at the at least one cross member adjacent to the outboard upright member. The at least one inboard upright member has a weakened region to control deformation of the seat assembly in an impact condition.

According to a further embodiment, the at least one inboard upright member is further provided with a plurality of inboard upright members, each laterally spaced apart from the outboard upright member. The weakened region is formed in each of the plurality of inboard upright members.

According to another further embodiment, the weakened region is formed midway along a length of the at least one inboard upright member.

According to yet another further embodiment, the at least one inboard upright member has a tubular cross section. The weakened region is flattened.

According to an even further embodiment, the flattened weakened region faces a rear direction of the seat assembly.

According to another further embodiment, the at least one inboard upright member is further provided with a structural wire. The weakened region is bent relative to a length of the structural wire.

According to another further embodiment, the weakened region is not formed in the outboard upright member.

According to another embodiment, a seat assembly is provided with a seat back frame with an outboard upright member, a plurality of inboard upright members laterally spaced apart from the outboard upright member, and at least one cross member interconnecting the outboard upright member and the plurality of inboard upright members. A latch mechanism is attached to the seat back frame at the outboard upright member, or at the at least one cross member adjacent to the outboard upright member. The plurality of inboard upright members each has a weakened region formed midway along a length thereof, to control deformation of the seat assembly in an impact condition. A weakened region is not formed in the outboard upright member. At least one of the plurality of inboard upright members has a tubular cross section. The weakened region of the tubular inboard upright member is flattened facing a rear direction of the seat assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
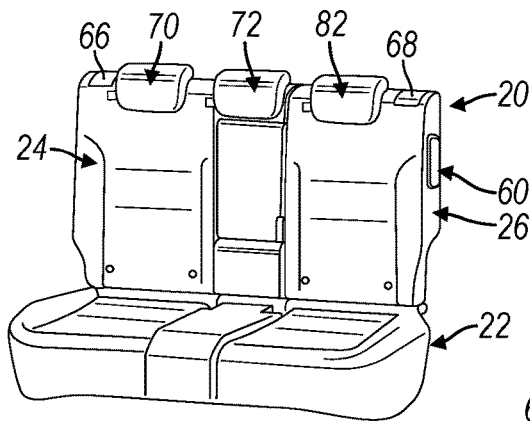
FIG. 1 is a front perspective view of a seat assembly according to an embodiment.

FIG. 1 illustrates a seat assembly 20 according to an embodiment. The seat assembly 20 is a vehicle seat assembly 20 for installation within a vehicle, such as a land vehicle, aircraft, watercraft, or the like. The seat assembly 20 is illustrated as a rear row seat assembly 20; however, the seat assembly 20 may be employed in any seating row within a vehicle. The seat assembly 20 is depicted as a bench seat assembly 20 with a bench seat bottom 22 for supporting up to three seated occupants. However, any number of seats may be employed. The seat bottom 22 is adapted to be installed to a vehicle floor.

The seat assembly 20 also includes a pair of seat back assemblies 24, 26 that extend upright relative to the seat bottom 22. The seat back assemblies 24, 26 are each supported by the vehicle to pivot relative to the vehicle for folding of each seat back assembly 24, 26 for collapsing of the seat assembly 20, or a region of the seat assembly 20. The larger seat back assembly 24 provides support for two occupants; and the smaller seat back assembly 26 provides support for one occupant. Seating arrangements of this type are often referred to as a 60/40 split seat assembly 20. This nomenclature indicates that the primary seat back assembly 24 provides approximately sixty percent of the seat back support of the bench seat assembly 20; and the secondary seat back assembly 26 provides approximately forty percent of the seat back support of the bench seat assembly 20.

Figure 2:
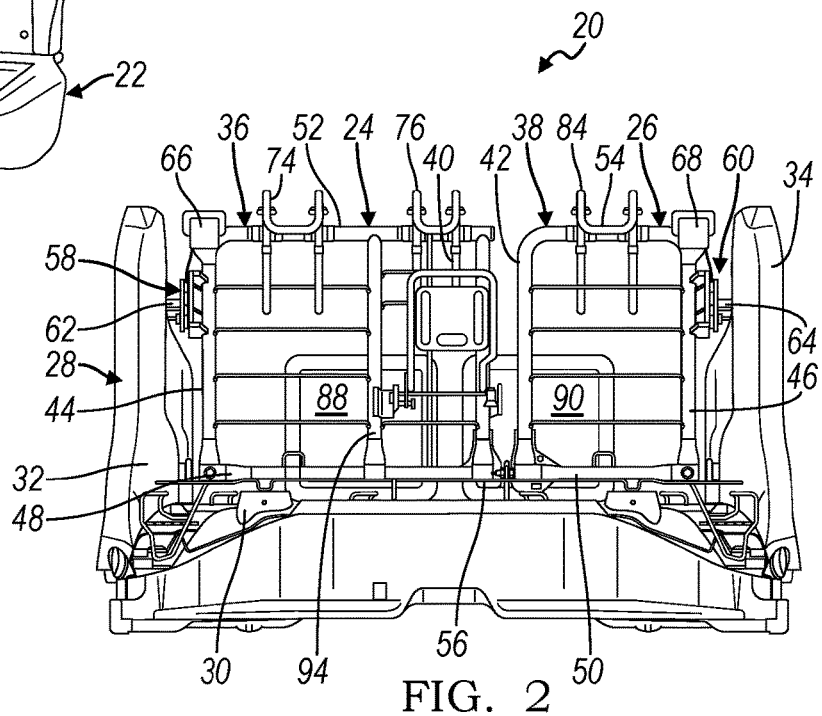
FIG. 2 is a front elevation view of the seat assembly of FIG. 1, illustrated partially disassembled.

FIG. 2 illustrates the seat assembly 20 installed to a vehicle body 28. The seat assembly 20 is also illustrated with foam and trim removed to reveal the underlying components of the seat assembly 20. The seat bottom 22 is also removed in FIG. 2. The seat bottom 22 is installed directly to a vehicle floor 30 of the vehicle body 28. The vehicle body 28 also includes a pair of upright panels 32, 34 that extend upright from the vehicle floor 30.

Figure 3:
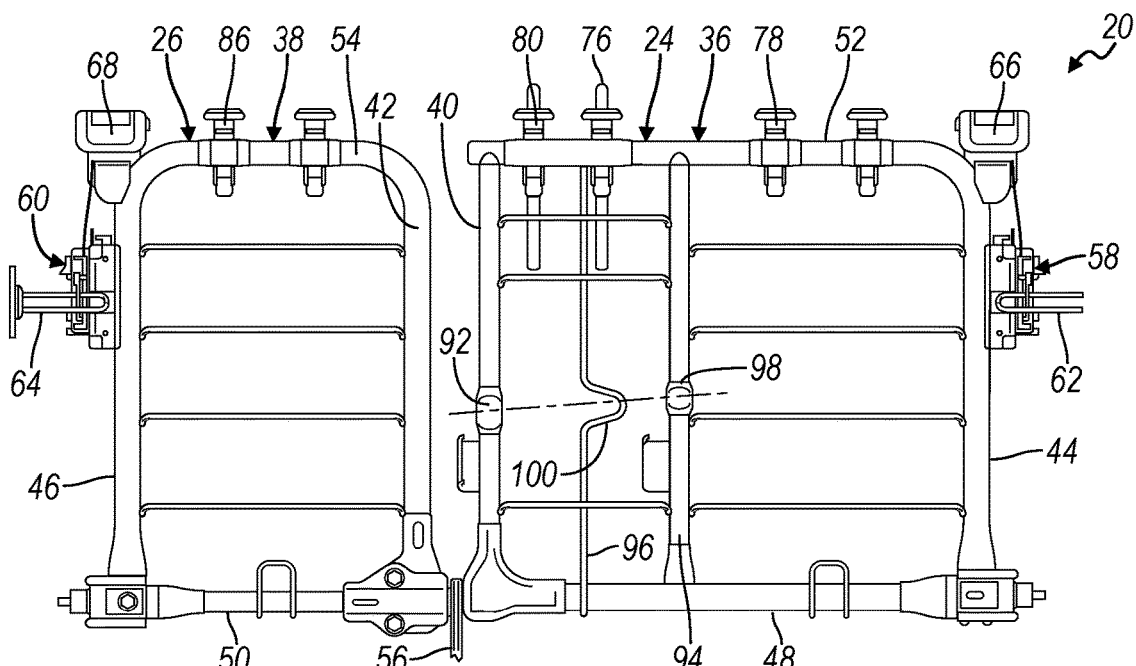
FIG. 3 is a rear elevation view of the seat assembly of FIG. 1.

As illustrated in FIGS. 2 and 3, the primary seat back assembly 24 includes a seat back frame 36. Likewise, the secondary seat back assembly 26 includes a seat back frame 38. The seat back frames 36, 38 may each be formed for suitable structural materials, such as stamped metal components. The components of each seat back frame 36, 38 may be formed unitarily, or may be assembled together, by welding or the like. Each of the seat back frames 36, 38 are pivotally connected to the vehicle body 28 for pivoting and folding of each seat back frame 36, 38. Each seat back frame 36, 38 includes an inboard upright member 40, 42 and outboard upright member 44, 46. Each seat back frame 36, 38 also includes a lower cross member 48, 50 and an upper cross member 52, 54 to interconnect the upright members 40, 42, 44, 46.

The seat back frames 36, 38 are each pivotally connected to the vehicle body panels 32, 34 adjacent to an intersection of each outboard upright member 44, 46 and the corresponding lower cross member 48, 50. Additionally, a pivot bracket 56 is mounted to the vehicle floor 30. The seat back frames 36, 38 are each pivotally connected to the pivot bracket 56 adjacent to an intersection of each inboard upright member 40, 42 and the corresponding lower cross member 48, 50.

The seat assembly 20 also includes a pair of latch mechanisms 58, 60. Each latch mechanism 58, 60 is mounted on an outboard upright member 44, 46 of the seat back frames 36, 38. The latch mechanisms 58, 60 each engage a striker 62, 64 mounted on one of the vehicle body upright panels 32, 34. Each latch mechanism 58, 60 is actuated by a manual unlock 66, 68 mounted to one of the upper cross members 52, 54 of the seat back frames 36, 38. The latch mechanisms 58, 60 lock each seat back frame 36, 38 to the vehicle body 28 in the upright position. In order to lower the seat back assemblies 24, 26, an occupant actuates the manual unlock 66, 68 to unlock the latch mechanism 58, 60 and pivot the seat back assembly 24, 26.

Referring now to FIG. 1, the primary seat back assembly 24 includes a pair of head restraint assemblies 70, 72. Referring now to FIGS. 2 and 3, each head restraint assembly 70, 72 includes a frame 74, 76 received in a pair of sleeves 78, 80 attached to the upper cross member 52. Referring back to FIG. 1, the secondary seat back assembly 26 includes a head restraint assembly 82. Referring again to FIGS. 2 and 3, the head restraint assembly 82 includes a frame 84 received in a pair of sleeves 86 attached to the upper cross member 54.

Seat assemblies 20 are designed to be light weight to minimize cost, to minimize weight, and to optimize fuel efficiency. The depicted seat assembly 20 is a rear seat assembly 20 between an occupant region and a cargo region of the vehicle. Referring to FIG. 2, a pair of luggage units 88, 90 are illustrated placed in the cargo region. During an impact condition of the vehicle, the vehicle may decelerate, thereby resulting in an impact of the luggage 88, 90 into a rear of the seat back assemblies 24, 26.

With light weight, compact seat assemblies 20, the seat back frames 36, 38 may deform under such cargo impact conditions. The cargo impact deformation, consequently, translates the head restraint assemblies 70, 72, 84. Likewise, the deformation may result in loss of retention of cargo. Deformation of the seat back frames 36, 38 is resisted by the latch mechanism 58, 60 and the pivotal connections. The central head restraint assembly 72 is spaced the furthest from the latch mechanisms 58, 60, and the pivotal connections. Therefore, the central head restraint assembly 72 is more susceptible to translation from deformation than the other head restraint assemblies 70, 82.

In order to minimize the translation of the central head restraint assembly 72, the seat assembly 20 could be provided with structural reinforcements. However, the drawbacks of adding structural reinforcements would be compromising the advantages of the light weight seat assembly 20. Therefore, instead of adding structural reinforcements to the seat assembly 20, the deformation of the seat assembly 20 is controlled to minimize the translation of the central head restraint assembly 72.

Figure 4:
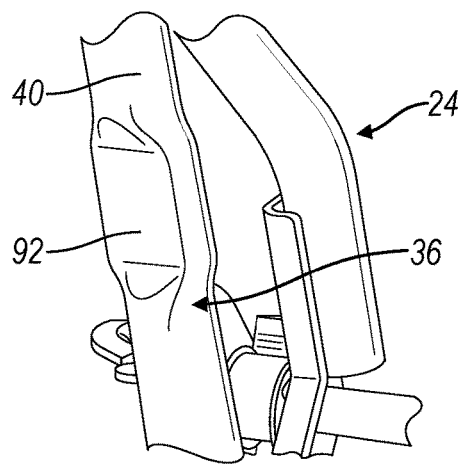
FIG. 4 is an enlarged partial front perspective view of a portion of the seat assembly of FIG. 1.

FIG. 3 illustrates a rear view of the seat assembly 20 from the cargo region. The inboard upright member 40 of the primary seat back frame 36 includes a weakened region 92 formed midway along its length to control deformation of the seat back frame 36 in the impact condition. The weakened region 92 is illustrated in greater detail in FIG. 4. The inboard upright member 40 is tubular and has a generally uniform cross section along its length. The weakened region 92 is flattened as a notch to remove a hollow center of the upright member 40 and to reduce a cross section of the upright member 40 at the weakened region 92. The flattened region 92 may formed by stamping or any suitable manufacturing process. The flattened weakened region 92 faces the cargo region of the vehicle body 28.

Referring again to FIG. 3, the primary seat back frame 36 includes a plurality of inboard upright members 40, 94, 96. Each of the inboard upright members 40, 94, 96 are spaced apart from the outboard upright member 44. The intermediate upright member 94 is also tubular and includes a flattened weakened region 98 formed midway along the length, similar to the weakened region 92 in the inboard upright member 40. The other intermediate upright member 96 is formed from metal wire with a weakened region 100 formed midway as a bent region. The weakened regions 92, 98, 100 of the inboard upright members 40, 94, 96 are aligned as depicted by the center line in FIG. 3 to illustrate a bend or buckle line formed in the seat back frame 36 that inclines in an outboard direction. The outboard upright member 44 does not include a weakened region, according to the depicted embodiment.

Figure 5:
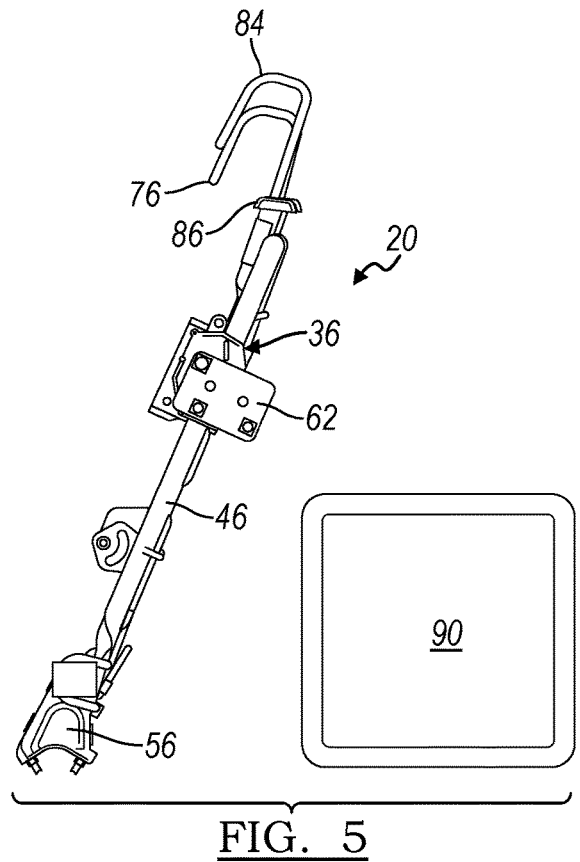
FIG. 5 is a right side elevation view of the seat assembly of FIG. 1, illustrated with cargo prior to an impact condition.
Figure 6:
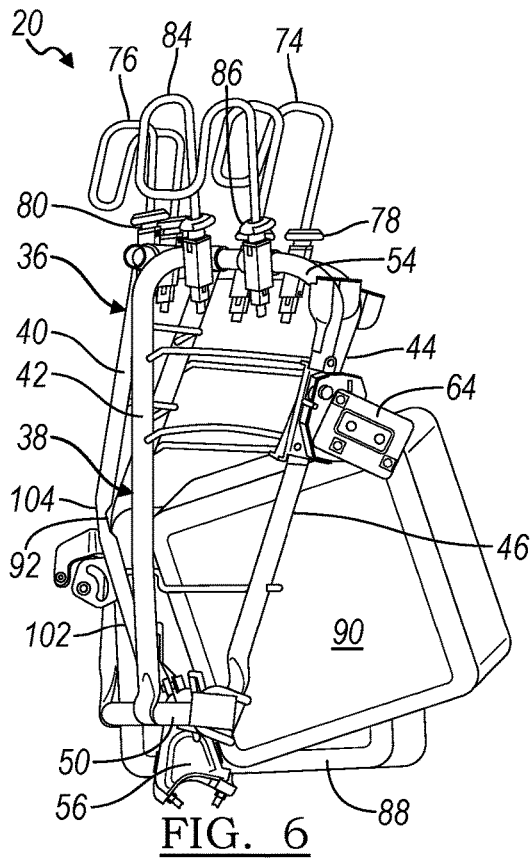
FIG. 6 is a right side elevation view of the seat assembly of FIG. 1, illustrated with cargo during an impact condition.
Figure 7:
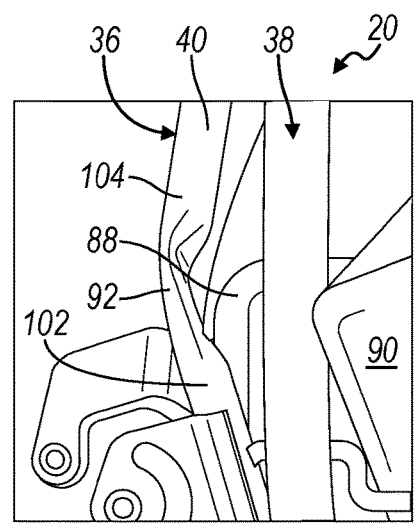
FIG. 7 is an enlarged partial right side elevation view of the seat assembly of FIG. 1 during the impact condition of FIG. 6.

FIG. 5 illustrates the seat assembly 20 from the right side, prior to an impact condition. FIG. 6 illustrates the seat assembly 20 again from the right side during an impact condition. During the impact condition, the vehicle is abruptly decelerated, resulting in an impact of the luggage 88, 90 into a rear of the seat back frames 36, 38. As illustrated in FIGS. 6 and 7, the inboard upright member 40 is buckled or bent at the weakened region 92 with an obtuse angle on the rear side. The deformation results in a lower region 102 of the inboard upright member 40 pivoting forward and beyond vertical, while an upper region 104 of the inboard upright member 40 is bent rearward and beyond vertical. Without the weakened regions 92, 98, 100, the upper region 104 would maintain a colinear arrangement with lower region 102 and would extend forward of vertical. The controlled deformation reduces forward translation of the center head restraint assembly 72 by approximately 115 millimeters (from 150 millimeters displacement to thirty-five millimeters) according to one embodiment.

The applicable loading illustrated in FIGS. 6 and 7 is according to relevant test requirements. The seat back frame 36 is designed for plastic deformation in order to absorb and dissipate the cargo impact.

Figure 8:
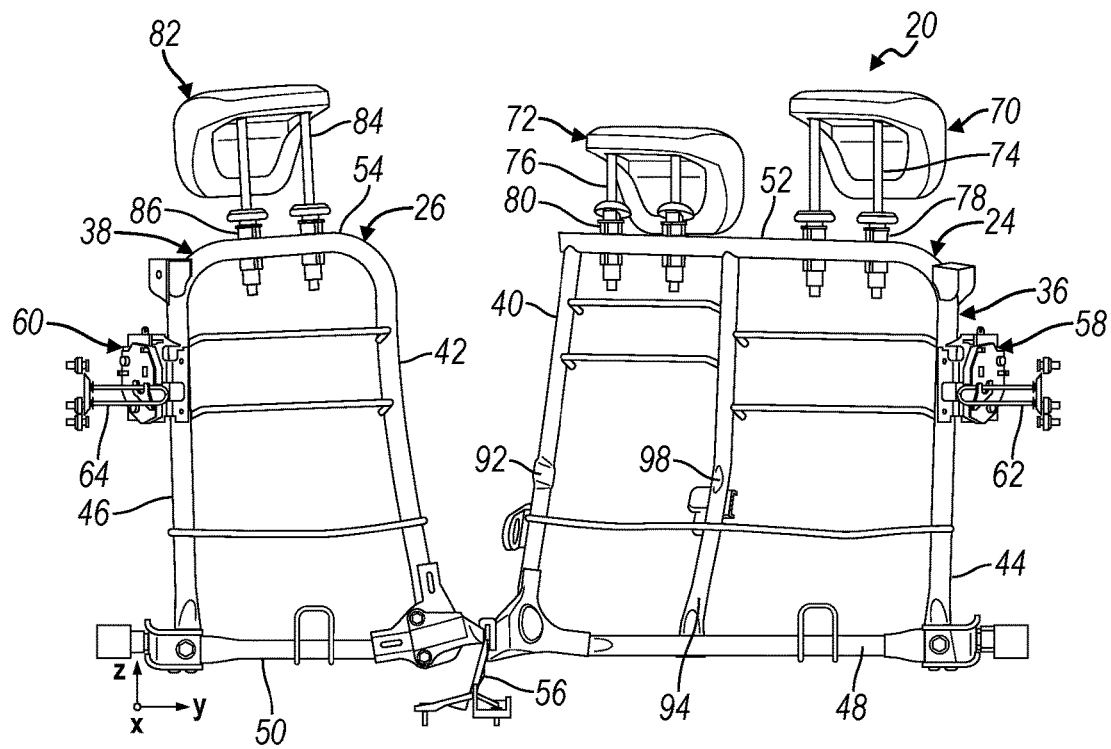
FIG. 8 is a rear elevation view of the seat assembly of FIG. 1, illustrated after the impact condition of FIG. 6.
Figure 9:
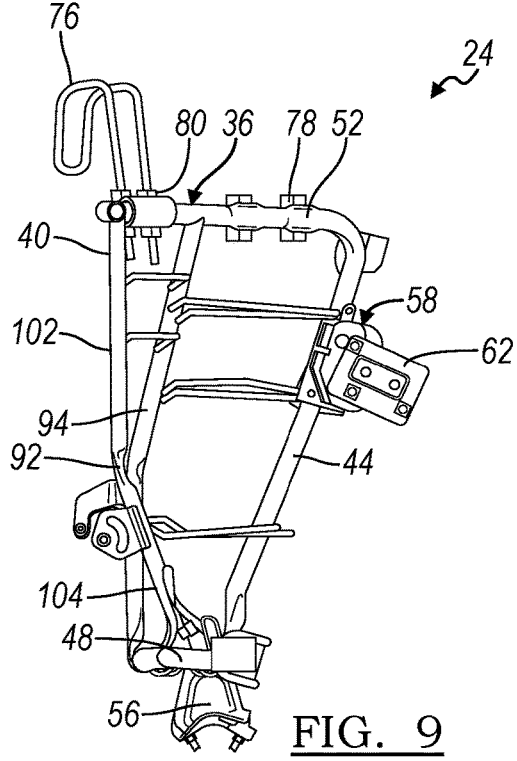
FIG. 9 is a partial right side elevation view of the seat assembly of FIG. 1, illustrated after the impact condition of FIG. 6.
Figure 10:
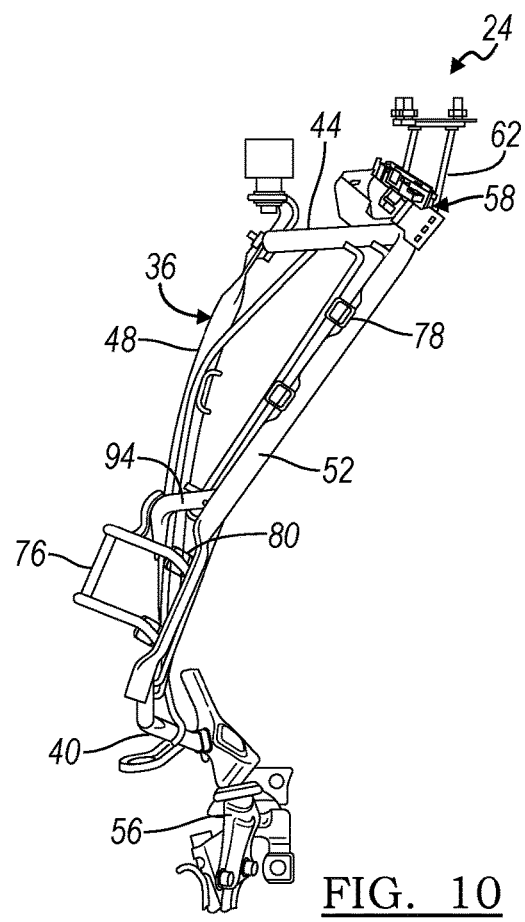
FIG. 10 is a partial top plan view of the seat assembly of FIG. 1, illustrated after the impact condition of FIG. 6.

FIGS. 8-10 illustrate the seat assembly 20 after the impact condition of FIGS. 6 and 7. FIG. 8 illustrates the deformation of both seat back frames 36, 38. The secondary seat back frame 38 is narrower than the primary seat back frame 36, and therefore, does not employ a weakened region in the depicted embodiment. The weakened regions 92, 98, 100 cause the seat back frame 36 to buckle along the inboard upright members 40, 94, 96 to control the deformation and mitigate translation of the head restraint frame 76. The deformation extents are illustrated in the right side view of the seat back assembly 24 in FIG. 9, and in the top plan view of the seat back assembly 24 in FIG. 10.

Although weakened regions are disclosed in inboard upright members, any structural member of any seat back frame 36, 38 may employ weakened regions to control deformation in an impact condition.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat back frame comprising:
a plurality of upright members; and
at least one cross member interconnecting the plurality of upright members;
wherein at least one of the plurality of upright members has a tubular cross section, and a flattened weakened region in between a first portion of the tubular cross section and a second portion of the tubular cross section and along a length of the tubular cross section of the at least one of the plurality of upright members, to control deformation of the seat back frame in an impact condition; and
wherein the flattened weakened region faces a rear direction of the seat back frame.

2. The seat back frame of claim 1 wherein the flattened weakened region is formed midway between the first portion and the second portion, along the length of the at least one of the plurality of upright members.

3. The seat back frame of claim 1 wherein the at least one of the plurality of upright members has a uniform cross section along a length thereof; and
wherein a cross section of the flattened weakened region is comparatively less than the uniform cross section.

4. The seat back frame of claim 1 wherein the at least one of the plurality of upright members further comprises a structural wire; and
wherein the flattened weakened region is bent relative to a length of the structural wire.

5. The seat back frame of claim 1 wherein the plurality of upright members further comprises:

an outboard upright member; and
at least one inboard upright member laterally spaced apart from the outboard upright member; and
wherein the flattened weakened region is formed in the at least one inboard upright member.

6. A seat assembly comprising:
the seat back frame of claim 5; and
a latch mechanism attached to the seat back frame at the outboard upright member, or at the at least one cross member adjacent to the outboard upright member.

7. The seat back frame of claim 5 wherein the flattened weakened region is not formed in the outboard upright member.

8. The seat back frame of claim 1 wherein the plurality of upright members further comprises:
an outboard upright member; and
a plurality of inboard upright members, each laterally spaced apart from the outboard upright member; and
wherein the flattened weakened region is formed in each of the plurality of inboard upright members.

9. A seat assembly comprising:
the seat back frame of claim 8; and
a latch mechanism attached to the seat back frame at the outboard upright member, or at the at least one cross member adjacent to the outboard upright member.

10. A seat assembly comprising:
the seat back frame of claim 1; and
a latch mechanism attached to the seat back frame at an outboard upright member of the plurality of upright members, or at the at least one cross member adjacent to the outboard upright member; and
wherein the flattened weakened region is formed in an inboard upright member spaced apart laterally from the outboard upright member.

11. A seat assembly comprising:
a seat back frame with an outboard upright member, at least one inboard upright member laterally spaced apart from the outboard upright member, and at least one cross member interconnecting the outboard upright member and the at least one inboard upright member; and
a latch mechanism attached to the seat back frame at the outboard upright member, or at the at least one cross member adjacent to the outboard upright member;
wherein the at least one inboard upright member has a tubular cross section and a flattened weakened region in between a first portion of the tubular cross section and a second portion of the tubular cross section and along a length of the tubular cross section of the inboard upright member, to control deformation of the seat assembly in an impact condition; and
wherein the flattened weakened region is not formed in the outboard upright member.

12. The seat assembly of claim 11 wherein the at least one inboard upright member further comprises a plurality of inboard upright members, each laterally spaced apart from the outboard upright member; and
wherein the flattened weakened region is formed in each of the plurality of inboard upright members.

13. The seat assembly of claim 11 wherein the flattened weakened region is formed midway between the first portion and the second portion along a length of the at least one inboard upright member.

14. The seat assembly of claim 11 wherein the flattened weakened region faces a rear direction of the seat assembly.

15. The seat back frame of claim 11 wherein the at least one inboard upright member further comprises a structural wire; and
wherein the flattened weakened region is bent relative to a length of the structural wire.

16. A seat assembly comprising:
a seat back frame with an outboard upright member, a plurality of inboard upright members laterally spaced apart from the outboard upright member, and at least one cross member interconnecting the outboard upright member and the plurality of inboard upright members; and
a latch mechanism attached to the seat back frame at the outboard upright member, or at the at least one cross member adjacent to the outboard upright member;
wherein the plurality of inboard upright members each has a flattened weakened region formed midway along a length thereof, to control deformation of the seat assembly in an impact condition;
wherein a weakened region is not formed in the outboard upright member;
wherein at least one of the plurality of inboard upright members has a tubular cross section; and
wherein the weakened region of the tubular inboard upright member is flattened facing a rear direction of the seat assembly.

17. The seat back frame of claim 1 wherein the flattened weakened region is flattened as a notch to remove a hollow centre of at least one of the plurality of upright members.

18. The seat assembly of claim 11 wherein the flattened weakened region is flattened as a notch to remove a hollow centre of the inboard upright member.

19. A seat back frame comprising:
a plurality of upright members; and
at least one cross member interconnecting the plurality of upright members;
wherein at least one of the plurality of upright members has a tubular cross section, and a flattened weakened region in between a first portion of the tubular cross section and a second portion of the tubular cross section and along a length of the tubular cross section of the at least one of the plurality of upright members, to control deformation of the seat back frame in an impact condition;
wherein the at least one of the plurality of upright members further comprises a structural wire; and
wherein the flattened weakened region is bent relative to a length of the structural wire.

20. A seat back frame comprising:
a plurality of upright members; and
at least one cross member interconnecting the plurality of upright members;
wherein at least one of the plurality of upright members has a tubular cross section, and a flattened weakened region in between a first portion of the tubular cross section and a second portion of the tubular cross section and along a length of the tubular cross section of the at least one of the plurality of upright members, to control deformation of the seat back frame in an impact condition;
wherein the plurality of upright members further comprises:
an outboard upright member, and
at least one inboard upright member laterally spaced apart from the outboard upright member;
wherein the flattened weakened region is formed in the at least one inboard upright member; and wherein the flattened weakened region is not formed in the outboard upright member.

21. A seat back frame comprising:
a plurality of upright members; and
at least one cross member interconnecting the plurality of upright members;
wherein at least one of the plurality of upright members has a tubular cross section, and a flattened weakened region in between a first portion of the tubular cross section and a second portion of the tubular cross section and along a length of the tubular cross section of the at least one of the plurality of upright members, to control deformation of the seat back frame in an impact condition;
wherein the plurality of upright members further comprises:
an outboard upright member, and
a plurality of inboard upright members, each laterally spaced apart from the outboard upright member; and
wherein the flattened weakened region is formed in each of the plurality of inboard upright members.

22. A seat assembly comprising:
a seat back frame with an outboard upright member, at least one inboard upright member laterally spaced apart from the outboard upright member, and at least one cross member interconnecting the outboard upright member and the at least one inboard upright member; and
a latch mechanism attached to the seat back frame at the outboard upright member, or at the at least one cross member adjacent to the outboard upright member;
wherein the at least one inboard upright member has a tubular cross section and a flattened weakened region in between a first portion of the tubular cross section and a second portion of the tubular cross section and along a length of the tubular cross section of the inboard upright member, to control deformation of the seat assembly in an impact condition;
wherein the at least one inboard upright member further comprises a plurality of inboard upright members, each laterally spaced apart from the outboard upright member; and
wherein the flattened weakened region is formed in each of the plurality of inboard upright members.

23. A seat assembly comprising:
a seat back frame with an outboard upright member, at least one inboard upright member laterally spaced apart from the outboard upright member, and at least one cross member interconnecting the outboard upright member and the at least one inboard upright member; and
a latch mechanism attached to the seat back frame at the outboard upright member, or at the at least one cross member adjacent to the outboard upright member;
wherein the at least one inboard upright member has a tubular cross section and a flattened weakened region in between a first portion of the tubular cross section and a second portion of the tubular cross section and along a length of the tubular cross section of the inboard upright member, to control deformation of the seat assembly in an impact condition; and
wherein the flattened weakened region faces a rear direction of the seat assembly.

24. A seat assembly comprising:
a seat back frame with an outboard upright member, at least one inboard upright member laterally spaced apart from the outboard upright member, and at least one cross member interconnecting the outboard upright member and the at least one inboard upright member; and
a latch mechanism attached to the seat back frame at the outboard upright member, or at the at least one cross member adjacent to the outboard upright member;
wherein the at least one inboard upright member has a tubular cross section and a flattened weakened region in between a first portion of the tubular cross section and a second portion of the tubular cross section and along a length of the tubular cross section of the inboard upright member, to control deformation of the seat assembly in an impact condition;
wherein the at least one inboard upright member further comprises a structural wire; and
wherein the flattened weakened region is bent relative to a length of the structural wire.

* * * * *